United States Patent [19]

Ohdaira

[11] Patent Number: 4,792,875
[45] Date of Patent: Dec. 20, 1988

[54] GIMBAL SPRING FOR FLOATING TYPE MAGNETIC HEAD

[75] Inventor: Hideichi Ohdaira, Nagaoka, Japan

[73] Assignee: Alps Electric Co., Ltd., Japan

[21] Appl. No.: 89,682

[22] Filed: Aug. 25, 1987

[30] Foreign Application Priority Data

Oct. 3, 1986 [JP] Japan ............................. 61-152243[U]

[51] Int. Cl.$^4$ .............................................. G11B 5/48
[52] U.S. Cl. ................................................... 360/104
[58] Field of Search ......................... 360/104, 106, 103

[56] References Cited

U.S. PATENT DOCUMENTS 4,605,979 8/1986 Inoue ............................... 360/104 X Primary Examiner—A. J. Heinz
Attorney, Agent, or Firm—Guy W. Shoup; Paul J. Winters; Leighton K. Chong

[57] ABSTRACT

A gimbals spring for supporting a floating type magnetic head has bent portions formed at both lateral edges of a load beam of the gimbals spring, the bent portions projecting in a direction in which the magnetic head projects from the load beam. A reinforcing plate is secured to the reverse side of the distal end portion of the load beam with respect to the magnetic head in order to make compensation for the strength of said distal end portion which is weakened due to the fact that the bent portions cannot extend as far as the distal end portion of the load beam because of the existence of the magnetic head. Thus, the bent portions do not take part in determination of the overall thickness of the magnetic head including the gimbals spring, which means that it is possible to reduce the thickness of the floating type magnetic head and minimize the size of the magnetic disk drive.

2 Claims, 1 Drawing Sheet

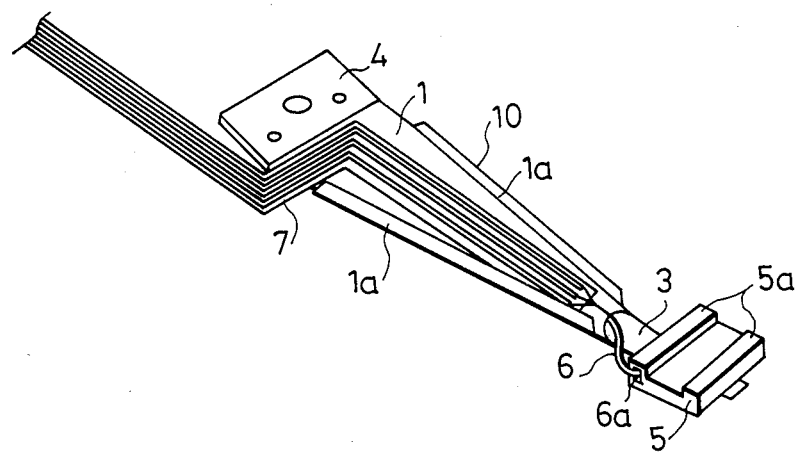
Fig.1
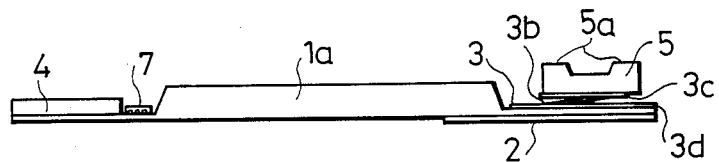
Fig.2
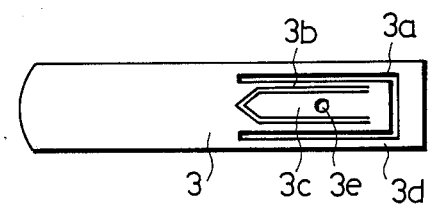
Fig.3
Fig.4 PRIOR ART
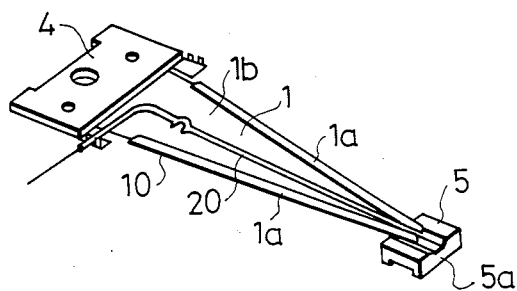

GIMBAL SPRING FOR FLOATING TYPE MAGNETIC HEAD

BACKGROUND OF THE INVENTION

1. Field of the Invention

The present invention relates to a structure of a gimbals spring for supporting a floating type magnetic head.

2. Description of the Related Art

Referring first to FIG. 4, which is a perspective view showing a conventional structure in which a floating type magnetic head 5 is supported by means of a gimbals spring 10, the magnetic head 5 is rigidly secured to the distal end of the gimbals spring 10 using an adhesive, a synthetic resin or the like through a flexure member which is fixed to said distal end of the spring 10 by means, for example, of welding. The gimbals spring 10 is composed of a load beam 1 and a mount 4, and bent portions 1a are formed so as to extend along both lateral edges, respectively, of the load beam 1 as far as the distal end of the load beam 1, the bent portions 1a projecting in the opposite direction to that in which the magnetic head 5 projects from the other side of the load beam 1. Further, a lead wire 20 is retained on the load beam 1 at the inner side of the bent portions 1a.

A plurality of magnetic disks are loaded in a magnetic disk drive (not shown), and the size, particularly the thickness, of this disk drive is determined by factors including the height of the floating magnetic head 5 and the gimbals spring 10. In the structure of the conventional gimbals spring 1, however, the bent portions 1a of the load beam 1 project in the opposite direction to that in which the magnetic head 5 projects from the other side of the load beam 1, and the lead wire 20 is disposed on the load beam 1 within the area defined by the bent portions 1a. For this reason, the height of the bent portions 1a directly takes part in the determination of the thickness of the floating type magnetic head 5 including the gimbals spring 1 and thus determines the thickness of the magnetic disk drive, disadvantageously.

SUMMARY OF THE INVENTION

In view of the above-described disadvantage of the prior art, it is a primary object of the present invention to provide a gimbals spring for supporting a floating type magnetic head in which bent portions are formed by bending both lateral edges of the load beam of the gimbals spring so that the bent portions project in a direction in which the floating type magnetic head projects from the load beam.

It is possible to eliminate the problem that the height of the bent portions of the load beam of the gimbals spring takes part in determination of the overall thickness of the floating type magnetic head including the gimbals spring by forming the bent portions so as to project in a direction in which the magnetic head mounted on the load beam projects. In this case, the bent portions cannot be formed so as to extend as far as the distal end portion of the load beam, and the strength of this distal end portion is weakened correspondingly. According to the present invention, therefore, a reinforcing plate is rigidly secured to the reverse side of the distal end portion of the load beam with respect to the magnetic head to make compensation for the lowered strength of the distal end portion.

The above and other objects, features and advantages of the present invention will become clear from the following description of the preferred embodiment thereof, taken in conjunction with the accompanying drawings.

BRIEF DESCRIPTION OF THE DRAWINGS

FIG. 1 is a perspective view showing the arrangement of a floating type magnetic head including the gimbals spring according to the present invention;

FIG. 2 is a side view of the magnetic head shown in FIG. 1;

FIG. 3 is a plan view of the flexure member of the magnetic head shown in FIG. 1; and FIG. 4 is a perspective view showing the arrangement of a prior art.

DESCRIPTION OF THE PREFERRED EMBODIMENT

One embodiment of the present invention will be described hereinunder in detail with reference to the accompanying drawings.

FIG. 1 is a perspective view showing one embodiment of the present invention, and FIG. 2 is a side view of the embodiment. Referring to these figures, a gimbals spring 10 consists of a load beam 1, a reinforcing plate 2, a flexure member 3 and a mount 4. A floating type magnetic head 5 is secured to the distal end of the flexure member 3. A coil 6a is formed in the magnetic head 5, and lead wires 6 which extend from both ends, respectively, of the coil 6a are connected to a flexible printed boad 7. Both lateral edges of the load beam 1 are bent so as to project in the direction in which the magnetic head 5 projects, that is, in the same direction as that in which the surface 5a of the head 5 faces the magnetic recording medium, thus providing bent portions 1a. The bent portions 1a extend to a position near the flexure member 3 but cannot extend as far as the distal end portion of the load beam 1 where the magnetic head 5 is mounted, which means that the strength of the distal end portion of the load beam 1 is weakened. Therefore, in order to reinforce the distal end portion of the load beam 1, the reinforcing plate 2 is secured to the reverse side of the load beam 1 with respect to the magnetic head 5 by means, for example, of welding, and the flexure member 3 is secured to the side of the load beam 1 which is closer to the magnetic head 5 by similar means. As shown in FIG. 3, grooves 3a are provided in the flexure member 3 by means, for example, of etching so as to define a Z-shaped structure in which a portion 3c which is bonded to the magnetic head 5 and a portion 3d which is secured to the load beam 1 extend parallel to each other and are connected together through a portion 3b. The flexible printed board 7 is, as shown in FIG. 1, secured to the side of the load beam 1 on which the magnetic head 5 is mounted, that is, the side of the load beam 1 which is closer to the magnetic recording medium, in such a manner that the printed board 7 extends toward the mount 4 and is bent at right angles near the mount 4 and led out to the outside through a cut portion defined between one bent portion 1a and the mount 4 so as to be connected to a circuit in the magnetic disk system.

As has been described above, according to the present invention, the bent portions 1a of the load beam 1 are bent so as to extend in a direction in which the floating type magnetic head 5 projects from the load beam 1 and therefore do not take part in determination of the overall thickness of the magnetic head including the gimbals spring. Accordingly, it is possible to reduce the thickness of the floating type magnetic head and narrow the spacing between each pair of adjacent magnetic recording media loaded in the magnetic disk drive. It is therefore possible to satisfactorily cope with the need to reduce the size of the magnetic disk drive.

Although the present invention has been described through specific terms, it should be noted here that the described embodiment is not necessarily exclusive and various changes and modifications may be imparted thereto without departing from the spirit and scope of the invention which is limited solely by the appended claims.

What is claimed is:

1. In a gimbal spring for supporting a floating type magnetic head at a distal end thereof extending lengthwise in one horizontal direction from a mounting member at an opposite end thereof, said gimbal spring including a flexure member at said distal end thereof and a load beam having one end mounted to said mounting member and its other end supporting said flexure member, wherein said magnetic head has an upper surface which is mounted to said flexure member of said gimbal spring and a lower surface which is placed in contact with a magnetic medium disposed in a horizontal plane in a downward direction from said gimbal spring, the improvement in said gimbal spring comprising:

said load beam having lateral edges extending widthwise in a transverse horizontal direction perpendicular to said one horizontal direction, and respective bent portions each formed at a respective one of said lateral edges projecting on a lower side of said load beam in said downward direction, which is the same direction said lower surface of said magnetic head faces, in order to obtain a thin profile for the structure of said load beam and magnetic head;

said bent portions extending along the length of said load beam near said flexure member but spaced a given distance therefrom; and a reinforcing plate secured to an upper side of said load beam, opposite from said lower side, substantially across said distance between the ends of said bent portions and said flexure member.

2. An improved gimbal spring according to claim 1, wherein a lead wire connected to said magnetic head extends along the length of said load beam on the lower side thereof in a space formed between said downwardly projected bent portions on the lateral edges thereof.

* * * * *